US008799966B2

(12) United States Patent
Howarter et al.

(10) Patent No.: US 8,799,966 B2
(45) Date of Patent: Aug. 5, 2014

(54) MIDDLEWARE BANDWIDTH SHIFTING

(75) Inventors: Jamie Howarter, Overland Park, KS (US); Douglas Ceballos, Olathe, KS (US); Michael Lesher, Louisburg, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 372 days.

(21) Appl. No.: 12/625,257

(22) Filed: Nov. 24, 2009

(65) Prior Publication Data

US 2011/0126247 A1 May 26, 2011

(51) Int. Cl.
*H04N 7/18* (2006.01)
*H04N 7/173* (2011.01)

(52) U.S. Cl.
USPC .............................................. 725/82; 725/96

(58) Field of Classification Search
USPC ........... 725/74, 82, 93, 95, 96, 100, 116, 119, 725/13, 134
See application file for complete search history.

(56) References Cited

U.S. PATENT DOCUMENTS

| 6,452,935 | B1 * | 9/2002 | Gibbs | 370/439 |
| 8,108,901 | B2 * | 1/2012 | Nicas et al. | 725/100 |
| 2004/0268407 | A1 * | 12/2004 | Sparrell et al. | 725/116 |
| 2006/0064733 | A1 * | 3/2006 | Norton et al. | 725/135 |
| 2007/0294717 | A1 * | 12/2007 | Hill et al. | 725/25 |
| 2009/0116379 | A1 * | 5/2009 | Rahman | 370/229 |

\* cited by examiner

*Primary Examiner* — John Schnurr
(74) *Attorney, Agent, or Firm* — Swanson & Bratschun, L.L.C.

(57) ABSTRACT

Embodiments of the disclosed invention include an apparatus, method, and computer program product for distributing media content to a plurality of display devices. For instance, in one embodiment, a computer implemented method for distributing media content to a display device is disclosed. The method comprises configuring a middleware device to provide media content to the display device and to a set of display devices. In response to the middleware device receiving a request for media content from the display device, the method determines whether the there is sufficient bandwidth to provide a requested media content to the display device. In one embodiment, if the method determines that there is insufficient bandwidth to provide the requested media content to the display device, the method provides the requested media content to the display device based on a set of preconfigured user preferences.

2 Claims, 4 Drawing Sheets

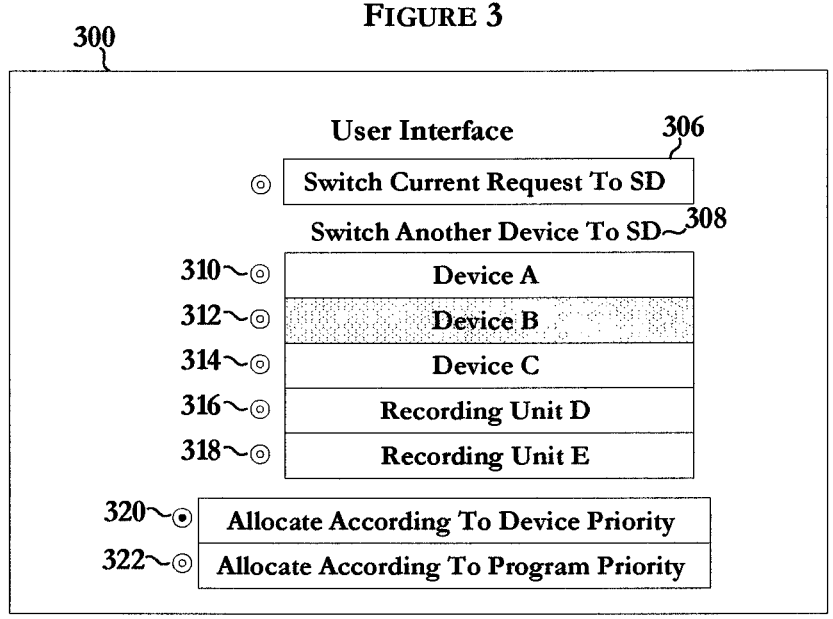
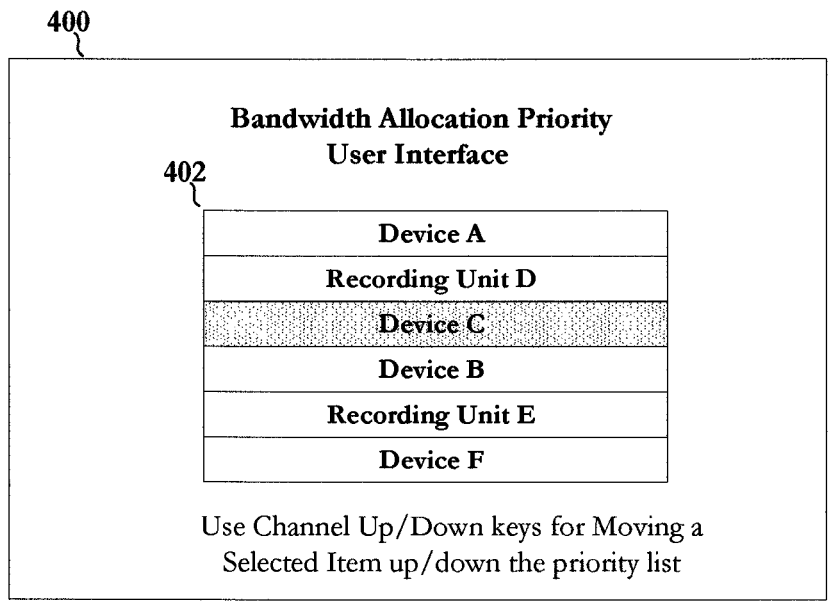

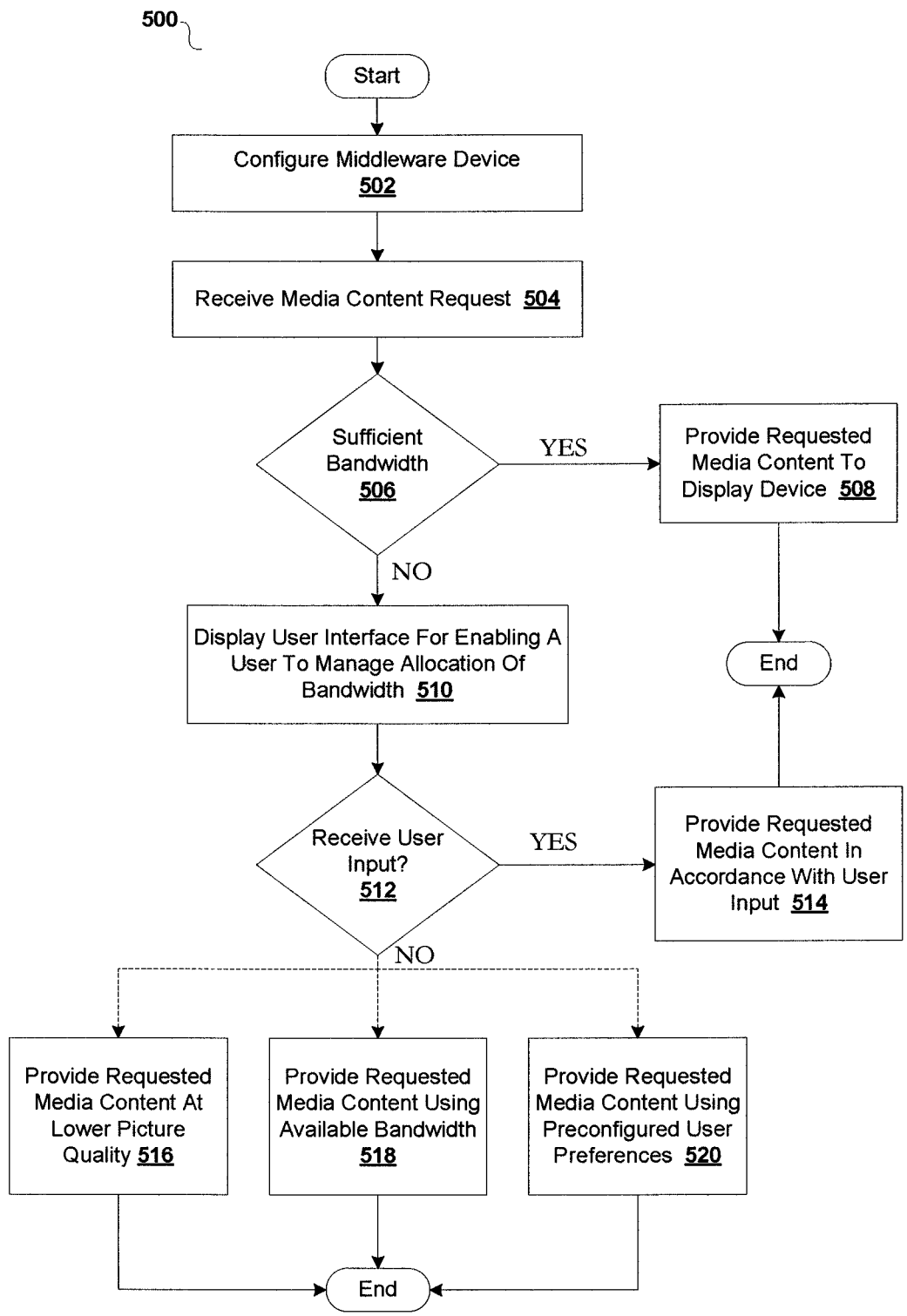

MIDDLEWARE BANDWIDTH SHIFTING

BACKGROUND OF THE INVENTION

High-Definition Television (or HDTV) is a digital television broadcasting system with higher resolution than traditional television systems (standard-definition TV, or SDTV). High-definition television yields a better-quality image than standard television because it has a greater number of lines of resolution. For instance, at a minimum, high-definition television has twice the linear resolution of standard-definition television. However, high-definition television generally requires two to four times as much bandwidth as standard-definition television. In some instances, a very high resolution source may require more bandwidth than available causing a distorted picture to be received.

SUMMARY

Embodiments of the disclosed invention include an apparatus, method, and computer program product for distributing media content to a plurality of display devices. In one embodiment, a computer implemented method for distributing media content to a display device is disclosed. The method comprises configuring a middleware device to provide media content to the display device and to a set of display devices. In response to the middleware device receiving a request for media content from the display device, the method determines whether the there is sufficient bandwidth to provide a requested media content to the display device. In one embodiment, if the method determines that there is insufficient bandwidth to provide a requested media content to the display device, the method displays a user interface for enabling a user to modify the request to a lower picture quality associated with the requested media content. The method provides the requested media content at the lower picture quality to the display device in response to receiving a modification request to decrease the requested media content signal to a lower picture quality.

In other embodiments, if the method determines that there is insufficient bandwidth to provide the requested media content to the display device, the method may automatically provide the requested media content to the display device at a lower picture quality. Alternatively, and/or in addition to, in some embodiments, if the method determines that there is insufficient bandwidth to provide the requested media content to the display device, the method may provide the requested media content to the display device based on a set of preconfigured user preferences.

BRIEF DESCRIPTION OF THE DRAWINGS

Illustrative embodiments of the present invention are described in detail below with reference to the attached figures, which are incorporated by reference herein and wherein:

FIG. 3 illustrates an embodiment of a user interface for enabling a user to manage bandwidth allocation in accordance with certain embodiments of the invention;

FIG. 4 illustrates an embodiment of a user interface for enabling a user to prioritize devices for bandwidth allocation in accordance with certain embodiments of the invention; and FIG. 5 illustrates an embodiment of a process for distributing media content in accordance with certain embodiments of the invention.

DETAILED DESCRIPTION

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and not intended to assert or imply any limitation with regard to the environment, architecture, design, or process in which different embodiments may be implemented.

Figure 1:
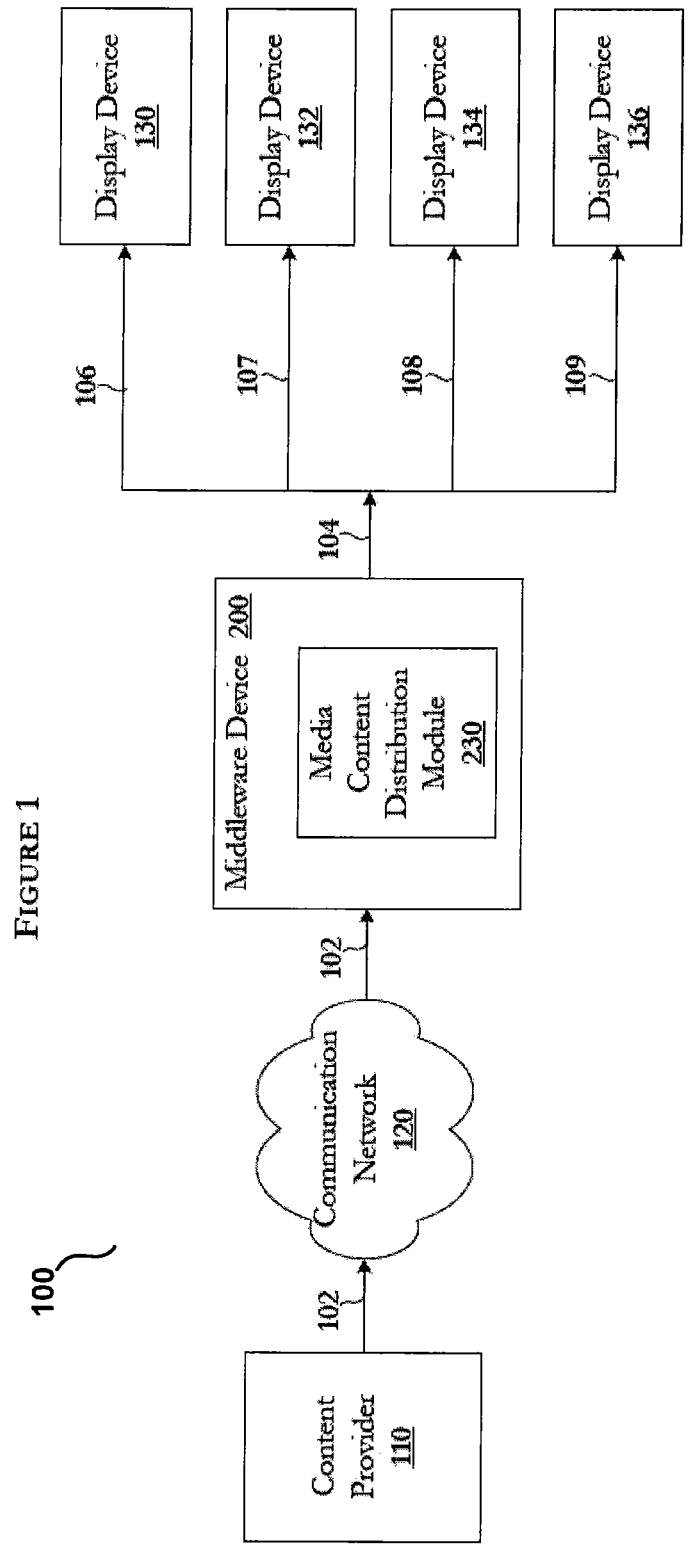
FIG. 1 depicts an embodiment of a network environment in which the illustrative embodiments may be implemented.

FIG. 1 depicts an embodiment of a network environment 100 in which the illustrative embodiments may be implemented. In the depicted embodiment, a content provider 110 transmits media content 102 to a middleware device 200 via communication network 120. Content provider 110 may be, but is not limited to, a cable, satellite, Internet Protocol Television (IPTV)/Internet television provider, and/or an Internet service provider. In some embodiments, communication network 120 may include, but is not limited to, one or more coaxial cable networks, fiber-optic networks, and/or satellite networks. In addition, in certain embodiments, communication network 120 may also include twisted pair networks and/or one or more IP networks, such as, but not limited to, the Internet, for providing IPTV/Internet cable television-type services.

Media content 102 may include audio and video content, such as, but not limited to, a television program. In some embodiments, media content 102 may include additional information, such as, but not limited to, an electronic programming guide and/or other information associated with the transmitted audio and video content. In addition, in some embodiments, media content 102 may include data, such as, but not limited to, data files, web page information, and/or Internet video and/or audio stream.

Middleware device 200 may be any type of device capable of distributing media content 102 to one or more display devices. For instance, in some embodiments, middleware device 200 may be, but is not limited to, a set-top box, a digital video recorder, a personal computer, and/or a router. In addition, in some embodiments, middleware device 200 may also include one or more components for decoding media content 102. For example, as will be further described, in some embodiments, middleware device 200 may include one or more cable tuners for decoding media content 102 and for providing the decoded media content to one or more display devices, such as, but not limited to, display device 130, display device 132, display device 134, and display device 136. Display device 130, display device 132, display device 134, and display device 136 may be any type of electronic device capable of displaying media content 102 to a user. In addition, in some embodiments, the term display device may include one or more recording components of middleware device 200 that are utilized to receive, decode, and record media content associated with a media content signal.

In accordance with certain embodiments, middleware device 200 may have a limited amount of bandwidth available for receiving media content 102 from content provider 110. Alternatively, and/or in addition to, in certain embodiments, middleware device 200 may have a limited amount of bandwidth 104 available for dispersing media content 102 to display device 130, display device 132, display device 134, and display device 136. As an example, in one embodiment, middleware device 200 may receive at most 25 megabits per second (Mbps) from content provider 110. For instance, in one embodiment, middleware device 200 may utilize 15-18 Mbps for incoming Internet data, 4-5 Mbps for a high-definition television stream, and 2 Mbps for a standard-definition television stream. Accordingly, if several display devices are requesting data simultaneously that expends the available bandwidth, then one or more of the display devices may experience performance issues and/or a loss in picture quality. For example, if display device 130 is utilizing the Internet to retrieve data 106 at 18 Mbps, display device 132 is receiving a high-definition television stream 107 at 4 Mbps, display device 134 is receiving a standard-definition television stream 108 at 2 Mbps, and display device 136 is requesting a high-definition television stream 109 that requires 4 Mbps of bandwidth, then middleware device 200 will have insufficient bandwidth to provide display device 136 with the requested high-definition television stream 109. In this scenario, display device 136 may receive a distorted picture and/or middleware device 200 may not transmit the requested high-definition television stream 109 to display device 136. Accordingly, as will be further described below, in certain embodiments, middleware device 200 may include a media content distribution module 230 for enabling a user to manage allocation of the available bandwidth to one or more of the display devices.

Figure 2:
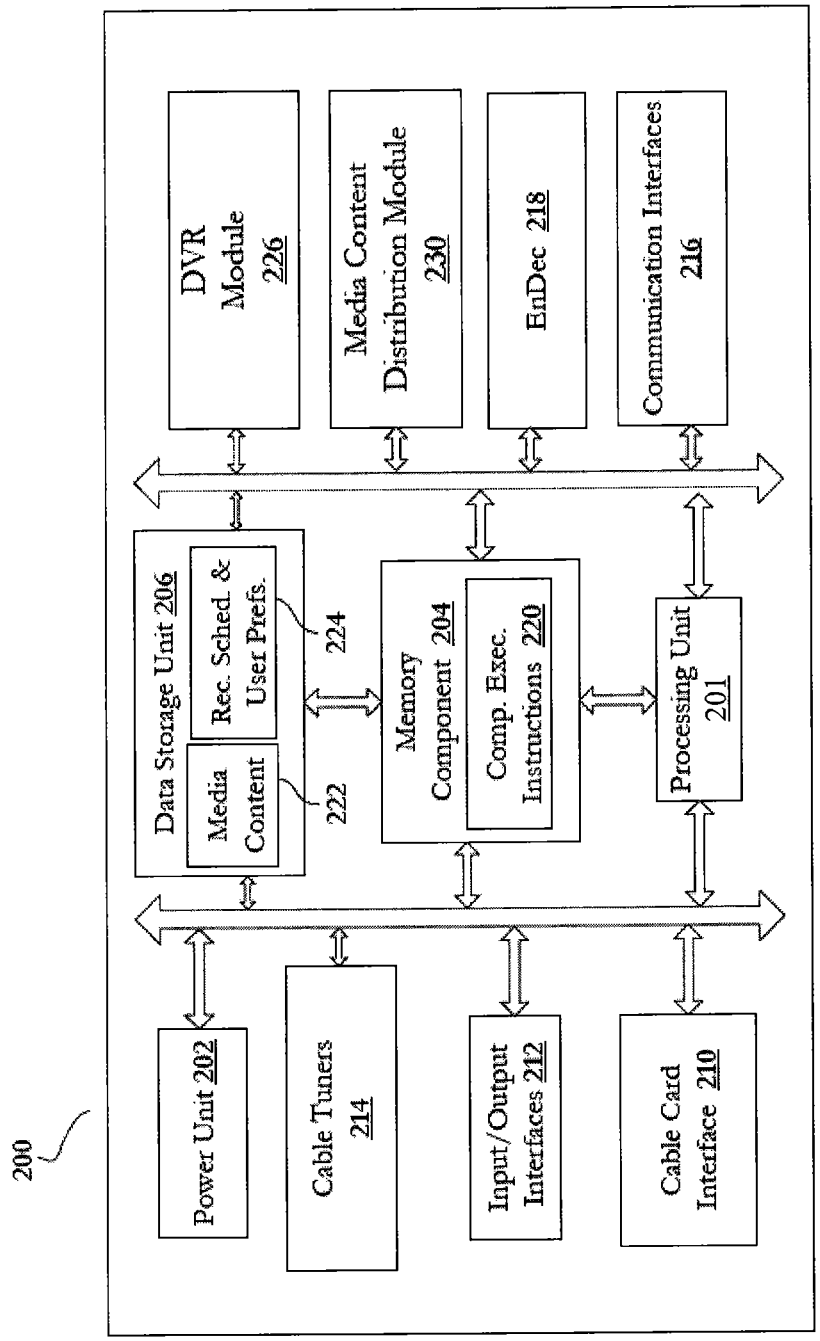
FIG. 2 illustrates a conceptual block diagram of a middleware device in accordance with certain embodiments of the invention.

FIG. 2 illustrates an embodiment of middleware device 200 in accordance with certain embodiments of the invention. In the depicted embodiment, middleware device 200 comprises, among other components, a processing unit 201, a power unit 202, a memory component 204, a data storage unit 206, and a set of communication interfaces 216. In one embodiment, power unit 202 converts the input power from an AC adaptor to run various components of middleware device 200. In addition, in some embodiments, power unit 202 may include an internal power source, such as, but not limited to, a battery component.

Processing unit 201 may comprise of one or more microprocessors for executing computer usable program code/instructions for distributing media content to a plurality of display devices. For example, in one embodiment, processing unit 201 executes computer executable instructions 220 stored in memory component 204 for reallocating bandwidth to a set of display devices based on a user selected option and/or a set of preconfigured user options.

In one embodiment, memory component 204 may be volatile memory. Volatile memory is memory that loses its contents when middleware device 200 loses power. For example, in some embodiments, memory component 204 may be random access memory (RAM). Random access memory stores currently executing instructions and/or data utilized by an operating system, software program, hardware device, and/or a user.

Data storage unit 206 is non-volatile memory, such as, but not limited to, one or more hard disk drives, that may be used to store permanent data on middleware device 200. In some embodiments, data storage unit 206 may be an external hard drive, a solid state drive, and/or a network data storage unit. In other embodiments, data storage unit 206 may include flash memory, such as, but not limited to, an xD (extreme Digital) card, SD (Secure Digital) card, or mini SD card. In one embodiment, data storage unit 206 may be utilize to store recorded media content files 222, such as, but not limited to, television content received from content provider 110. In addition, in some embodiments, data storage unit 206 may store a set of user preferences 224 for prioritizing allocation of bandwidth to one or more display devices and/or one or more recording components.

In accordance with the disclosed embodiments, middleware device 200 may include a set of communication interfaces 216 for receiving media content 102 from content provider 110. In some embodiments, communication interfaces 216 may include, but is not limited to, a coaxial cable connection, an Ethernet port, and/or a telephone line interface for connecting middleware device 200 to communication network 120.

In addition, middleware device 200 may include a set of input/output interfaces 212 for connecting middleware device 200 to one or more display devices. For example, in one embodiment, communication interfaces 216 may include, but is not limited to, one or more coaxial cable connections, audio/video components connections, digital visual interfaces (DVI), S-video connections, composite video connections, and/or a high-definition multimedia interfaces (HDMI). Additionally, in some embodiments, communication interfaces 216 may include other data communication interfaces, such as, but not limited to, a 1394 interface and/or a universal serial bus (USB) interface.

Additionally, middleware device 200 may also include one or more cable tuners 214 for receiving and extracting the contents of media content 102. For instance, in one embodiment, cable tuner 214 includes a filter that passes a particular 6 MHz channel and combines it with a local oscillator signal to extract a stream of compressed MPEG video packets. In one embodiment, cable tuners 214 may be one or more quadrature amplitude modulation (QAM) tuners. A QAM tuner is an electronic tuning device used to extract media content from signals that are encoded using quadrature amplitude modulation format. In other embodiments, cable tuners 214 may be one or more advanced television systems committee (ATSC) tuner. An ATSC tuner is a device that is used in the reception of digital television signals (DTV), including, but not limited to, high definition television (HDTV) signals, standard definition television (SDTV) signals, data broadcasting, multi-channel surround-sound audio, and satellite direct-to-home broadcasting. In addition, in some embodiments, cable tuners 214 may decompress and demodulate the inbound television signals and/or may convert analog television signals broadcasted over the air to a digital signal that can be manipulated, such as, but not limited to, media reformatting, for enabling viewing on a particular television set.

Middleware device 200 may also include one or more encoder/decoder (EnDec) modules 218 for decoding the MPEG packets into an uncompressed digital video bit stream. For example, in some embodiments, EnDec modules 218 may be a MPEG-2 encoder/decoder that is utilized to encode an analog television signal into MPEG format and/or decode a MPEG format signal for generating a viewable signal. MPEG-2 is a standard for the generic coding of moving pictures and associated audio information. MPEG-2 is widely used for digital television signals that are broadcast over-the-air, by cable, and by direct broadcast satellite TV systems.

In addition, in some embodiments, middleware device 200 may include a cable card interface 210 for interfacing with a plug-in cable/smart card that enables viewing and/or recording of cable television programming. For example, in some embodiments, cable card 210 comprises instructions and/or a decryption key for decoding encrypted cable television signals transmitted by content provider 110.

In certain embodiments, middleware device 200 may include a digital video recorder (DVR) module 226 for managing the recording of one or more media content files and for playback of stored media content files 222. In some embodiments, DVR module 226 may manage one or more recording units for recording media content for future playback. For instance, in one embodiment, middleware device 200 may include dual recording units for enabling a user to configure middleware device 200 to record two media content streams/signals simultaneously. As will be further described, in one embodiment, a user may prioritize the bandwidth allocation to the recording units as well as to a set of display devices coupled to middleware device 200.

As stated above, in certain embodiments, middleware device 200 includes media content distribution module 230 for enabling a user to manage allocation of the available bandwidth to one or more of the display devices and/or to one or more recording components of middleware device 200. For instance, in one embodiment, media content distribution module 230 may include executable instructions for presenting a user interface to notify a user that there is insufficient bandwidth to provide a requested high-definition television stream. In certain embodiments, the user interface may include an option for the user to switch the request from a high-definition television stream to a lower quality picture, such as, but not limited to, a standard-definition television stream. In addition, in some embodiments, the user interface may include an option for the user to switch another display device and/or recording stream to a lower picture quality/bandwidth for enabling a particular display device to receive the requested high definition television stream.

In addition, in some embodiments, media content distribution module 230 may include executable instructions for presenting a user interface for enabling a user to pre-configure a priority setting for prioritizing bandwidth allocation to the one or display devices and/or one or more recording streams. For instance, in one embodiment, a user may configure middleware device 200 to always provide high-definition television to display device 130, e.g., a television located in the media room, and/or a user may configure middleware device 200 to re-distribute bandwidth, as necessary, from an allotted Internet data bandwidth to provide a requested television stream.

Referring now to FIG. 3, an embodiment of a user interface 300 for enabling a user to manage bandwidth allocation is illustrated in accordance with certain embodiments of the invention. In one embodiment, middleware device 200 displays user interface 300 in response to a determination that there is insufficient bandwidth to provide a requested media content to a requesting display device. For example, if a display device requests a high-definition television program/stream requiring 5 Mbps and only 3 Mbps of bandwidth is available, middleware device 200 may be configured to present user interface 300 to notify a user that there is insufficient bandwidth to provide the requested high-definition television stream. In one embodiment, middleware device 200 may be configured to present user interface 300 only on the requesting display device. In other embodiments, middleware device 200 may be configured to present user interface 300 on all display devices communicatively coupled to middleware device 200.

In the depicted embodiment, a user may elect option 306 to switch the current media content request from a high-definition television stream to a standard-definition television stream. Alternatively, in some embodiments, user interface 300 may include an option 308 for enabling a user to switch another display device that is communicatively coupled to middleware device 200 and/or a recording stream to a lower definition television stream. For example, in one embodiment, a user may elect to either switch device A (option 310), device B (option 312), device C (option 314), recording unit D (option 316), and/or recording unit E (option 318) to a lower definition television signal. In addition, in some embodiments, user interface 300 may include a device priority option 320 for enabling a user to select allocation of the bandwidth in accordance with a preconfigured device priority setting. Similarly, in some embodiments, user interface 300 may include a program priority option 322 for enabling a user to select allocation of the bandwidth in accordance with a preconfigured priority setting associated with televised programs. For instance, in one embodiment, middleware device 200 may utilize the preconfigured priority settings associated with the recording of one or more television programs in determining whether to adjust a requested high definition television signal to a standard definition television signal or to adjust another incoming high definition television signal to standard definition.

FIG. 4 illustrates an embodiment of a user interface 400 for enabling a user to prioritize devices for bandwidth allocation in accordance with certain embodiments of the invention. In the depicted embodiment, user interface 400 includes a priority list 402 of display devices and recording units associated with middleware device 200. In one embodiment, a user may use directional keys and/or other buttons on a remote control device to move a particular display device/recording unit up or down priority list 402 to arrange a priority for allocating bandwidth to the display devices/recording units associated with middleware device 200. In one embodiment, middleware device 200 may utilize the preconfigured priority settings associated with user interface 400 as a default setting for allocating the available bandwidth in response to a determination that there is insufficient bandwidth to provide a requested high definition media content signal to a requesting display device/recording unit. For instance, in one embodiment, if middleware device 200 does not receive a user response within a specified time after displaying user interface 300, middleware device 200 may automatically default to the preconfigured device priority settings illustrated in FIG. 4. In other embodiments, middleware device 200 may be configured to default to a set of preconfigured priority settings that prioritize the requested media content against other media content that are simultaneously received by middleware device 200. For example, in one embodiment, middleware device 200 may utilized a priority recording schedule to give bandwidth preference to higher priority programs.

FIG. 5 illustrates an embodiment of a process for distributing media content in accordance with certain embodiments of the invention. Process 500 may be executed by an audio/video receiving device, such as, but not limited to, middleware device 200. Process 500 begins, at block 502, by configuring a middleware device to provide media content to a display device and a set of display devices (i.e., at least one additional display device/recording unit). At block 504, the process receives, at the middleware device, a request for media content from the display device. The process determines at block 506 whether there is sufficient bandwidth to provide the requested media content to the display device. At block 508, the process provides the requested media content to the display device in response to a determination that there is sufficient bandwidth to provide the requested media content to the display device, with process 500 terminating thereafter.

However, in one embodiment, if the process determines that there is insufficient bandwidth to provide the requested media content to the display device, the process, at block 510, displays a user interface for enabling a user to manage allocation of the bandwidth to the display device and to the set of display devices. For example, in one embodiment, the user interface may include an option for enabling the user to modify the request to a lower picture quality associated with the requested media content. Additionally, in some embodiments, the user interface may include an option for enabling the user to modify a receiving signal stream associated with another display device to a lower picture quality and/or to cancel a signal stream associated with another display device. At block 512, the process determines whether a user input response is received within a prespecified time. If the process receives a user input within the specified time, the process provides the requested media content in accordance with the user input at block 514, with process 500 terminating thereafter. For example, if the process receives a modification request to lower the picture quality associated with the requested media content (e.g., from HD to SD), the process provides the requested media content at the lower picture quality to the display device.

In one embodiment, if the process does not receive a user input within the specified time, the process, at block 516, automatically provides the requested media content at a lower picture quality. In another embodiment, if the process does not receive a user input within the specified time, the process, at block 518, provides the requested media content to the display device using a best effort based on the available bandwidth. As referenced herein, best effort means that middleware device 200 attempts to provide the requesting display device the requested media content using the available bandwidth without any assurance that the requested media content is delivered or that the requested media content is of a guaranteed quality of service level or a certain priority.

Alternatively, and/or in addition, in some embodiments, if the process does not receive a user input within the specified time, the process, at block 520, provides the requested media content using one or more preconfigured user preferences. For instance, in one embodiment, if the process does not receive a user input within the specified time, the process adjusts the bandwidth allocation in accordance with a set of preconfigured device priority settings. For example, if a particular requesting display device has a higher priority setting than a second display device, then middleware device 200 will switch the media content signal received by the second display device to a lower picture quality to enable the requesting display device to receive the requested media content at a higher quality.

Accordingly, the above disclosure discloses several embodiments including a system and method for distributing media content to a plurality of devices by dynamically adjusting the available bandwidth based on prioritization of one or more display devices. The above disclosure describes certain embodiments of the claimed invention and is not intended to limit the scope of the claimed invention. In addition, the disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions, hardware components, and/or any combination thereof. In addition, the flowchart and block diagrams in the figures illustrate the architecture, functionality, and operation of possible implementations of systems, methods and computer program products according to various embodiments of the claimed invention. In this regard, each block in the flowchart or block diagrams may represent a module, segment, or portion of code, which may include one or more executable instructions for implementing the specified logical function(s). In some alternative implementations, the functions noted in the block may occur out of the order noted in the figures and/or may be omitted. In addition, two blocks shown in succession may, in fact, be executed substantially concurrently, or the blocks may sometimes be executed in the reverse order, depending upon the functionality involved.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. In addition, as referenced herein, a module is defined as hardware, software, and/or a combination thereof for performing a particular function. Software is defined as computer executable instructions including, but not limited to, object code, assembly code, and machine code. Hardware may include, but is not limited to, one or more processors/microprocessors, electronic circuitry, and other physical components. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

We claim:

1. A computer implemented method for distributing media content, the method comprising:
configuring a set-top box to provide media content to a set of display devices, wherein the set-top box has a limited amount of bandwidth available for receiving media content from a content provider;
receiving at the set-top box a request for media content from a display device;
determining whether there is sufficient bandwidth to provide the requested media content to the display device;

responsive to a determination that there is sufficient bandwidth to provide the requested media content to the display device, providing the requested media content to the display device;
responsive to a determination that there is insufficient bandwidth to provide the requested media content to the display device, displaying a user interface for enabling a user to modify the request to a lower picture quality associated with the requested media content, wherein the user interface further includes an option to modify a picture quality associated with a second display device within the set of display devices to free up bandwidth to provide the requested media content to the display device, wherein the second display device is selected from a group of devices and one or more recording units;
responsive to receiving a modification request to the lower picture quality associated with the requested media content, providing the requested media content at the lower picture quality to the display device; and
providing the requested media content to the display device based on a set of preconfigured user preferences in response to not receiving the modification request to the lower picture quality associated with the requested media content within a specified time, wherein the user interface includes an option for the user to select between allocating based on device priority or allocating based on program priority, wherein allocating based on device priority prioritizes the requested media content against other media content provided to the set of display devices as well as media content being recorded by the one or more recording units based on a receiving device, and wherein allocating based on program priority prioritizes based on a media content priority.

2. A set-top box comprising:
a communication interface for receiving media content from a content provider, wherein the communication interface has a limited amount of bandwidth available for receiving media content from a content provider;
an input/output interface for distributing the media content to a display device and a set of display devices;
a memory component for storing computer executable instructions;
a processing unit for executing the computer executable instructions to:
  determine whether there is sufficient bandwidth to provide a requested media content to the display device;
  responsive to a determination that there is sufficient bandwidth to provide the requested media content to the display device, providing the requested media content to the display device;
  responsive to a determination that there is insufficient bandwidth to provide the requested media content to the display device, displaying a user interface for enabling a user to modify the requested media content to a lower picture quality, wherein the user interface includes an option to modify a picture quality associated with a second display device to a lower picture quality within the set of display devices to free up bandwidth to provide the requested media content to the display device wherein the second display device is selected from a group of devices and one or more recording units;
  responsive to receiving a modification request to the lower picture quality associated with the requested media content, providing the requested media content at the lower picture quality to the display device; and
  provide the requested media content to the display device based on a set of preconfigured user preferences in response to not receiving the modification request to the lower picture quality associated with the requested media content within a specified time, wherein the user interface includes an option for the user to select between allocating based on device priority or allocating based on program priority, wherein allocating based on device priority prioritizes the requested media content against other media content provided to the set of display devices as well as media content being recorded by the one or more recording units based on a receiving device, and wherein allocating based on program priority prioritizes based on a media content priority.

* * * * *